March 9, 1965 J. VALIELA 3,172,402
PORTABLE BARBECUE GRILL
Filed Jan. 24, 1963 2 Sheets-Sheet 1
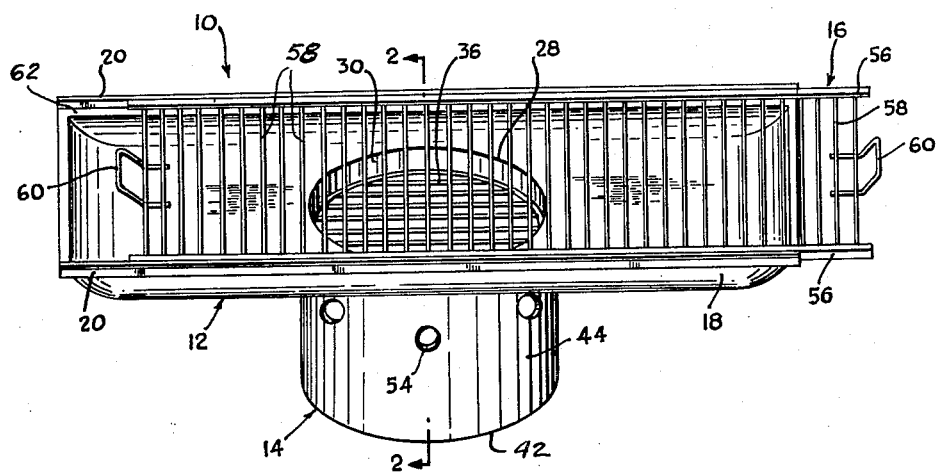
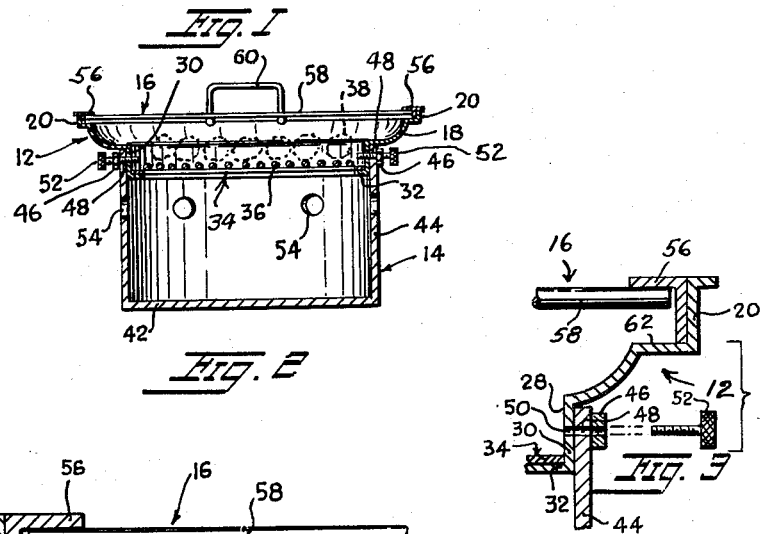
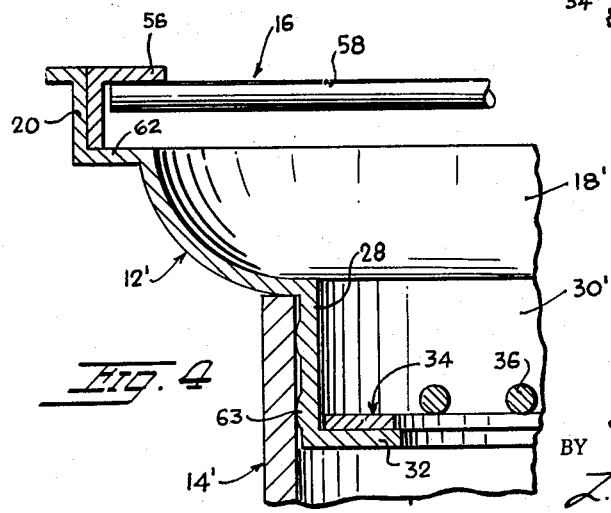
INVENTOR.
JOSÉ VALIELA
BY
ATTORNEY March 9, 1965  J. VALIELA  3,172,402
PORTABLE BARBECUE GRILL
Filed Jan. 24, 1963  2 Sheets-Sheet 2

INVENTOR.
JOSÉ VALIELA
BY
L. S. Saulsbury
ATTORNEY

United States Patent Office 3,172,402
Patented Mar. 9, 1965

3,172,402
PORTABLE BARBECUE GRILL
José Valiela, Highland Park, N.J.
(118 Leroy, 6–E, Potsdam, N.Y.)
Filed Jan. 24, 1963, Ser. No. 253,555
1 Claim. (Cl. 126—25)

This invention relates to barbecue grill assemblies and more particularly to a new and useful improvement in a portable barbecue grill assembly for use in gardens, patios or other outdoor places and for use indoors in fireplaces and kitchens having means of ventilation.

In an ordinary barbecue grill, the fire is built in a bowl-shaped fireplace or brazier wherein the ashes accumulate around the charcoal, thereby interfering with the combustion of the charcoal. Therefore, before a new fire can be started or effective combustion obtained, the ashes must be removed. This is laborious and time consuming.

Furthermore, in the ordinary barbecue grill, no means is provided for moving the cooked meat or other cooked article away from the fire and supporting it on the grill so that the cooked meat can be kept warm until eaten.

The ordinary barbecue grill is usually so shaped and constructed that it is usually fixed in position and does not lend itself to ready removable mounting on a movable or fixed support.

It is, therefore, the principal object of the present invention to eliminate these difficulties and disadvantages by providing a barbecue grill assembly wherein the ashes drop from the brazier unit supporting the charcoal to a point remote therefrom so as not to interfere with the combustion of the charcoal and so as to avoid the necessity of constantly removing the ashes.

Another object of the invention is to provide a barbecue grill assembly with an improved brazier unit wherein the ashes are supported remote from the charcoal and wherein the air flows upwardly from beneath and between the charcoal pieces and around the same, thereby accelerating the combustion of the charcoal and thus effortlessly "liven" the fire.

A further object of the invention is to provide an elongated readily slidable grill for supporting the meat or other article to be cooked whereby the meat can be readily moved away from the fire when cooked yet supported on the heated grill adjacent the fire in position to be kept in a warmed condition, thereby eliminating the necessity of removing the meat completely off of the grill.

A still further object of the invention is to provide a grill assembly of this character that is simple and rugged in construction, effective for the purposes intended and that can be manufactured and sold at a reasonable cost.

Broadly, the invention comprises an improved metal brazier construction consisting of an elongated shallow pan with a central depending open rim portion supporting spaced round grate bars for supporting the charcoal and a removable deep hollow cylindrical vented metal container for holding the ashes, and an elongated metal grill slidably mounted on the pan or tray for supporting the meat or other article to be cooked.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a top perspective view of a barbecue grill assembly embodying one form of my invention, the grill being shown in slightly laterally moved or pulled condition.

FIG. 2 is a vertical sectional view taken on the line 2—2 of FIG. 1.

FIG. 3 is an enlarged sectional view of one side of the brazier pan.

FIG. 4 is a still further enlarged fragmentary vertical sectional view of a modified means of attaching the ash container to the brazier unit.

Figure 5:
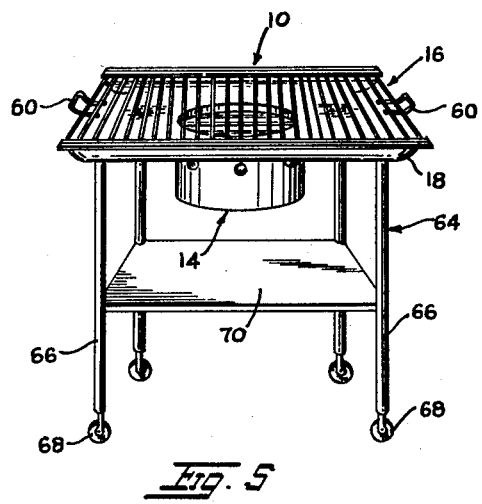
FIG. 5 is a top perspective view of the barbecue grill assembly of FIG. 1 mounted on and applied to a rollable cart type conveyance.

Referring now in detail to the various views of the drawings, in FIG. 1 a barbecue grill assembly embodying one form of my invention is shown and designated generally at 10. The assembly 10 is formed of metal and comprises broadly a brazier unit or charcoal furnace 12, an ash container 14 removably mounted on the brazier unit and a grill 16 slidably mounted on the brazier unit 12.

The brazier unit 12 consists of an elongated rectangular pan 18 having a bottom wall and a pair of spaced parallel upwardly extending side walls which terminate at the upper ends thereof in outwardly and upwardly extending L-shaped flanges 20. The bottom wall of the pan 18 is provided with a centrally disposed circular opening 28 intermediate the ends thereof. A cylindrical ring 30, having an inwardly extending annular flange 32 at the lower end thereof, is secured to the bottom wall of the pan 18, about the opening 28 therein, and extends downwardly therefrom. A plurality of closely spaced parallel grate bars 36 are secured in fixed position on the flange 32 thereby providing a ring grate 34 for supporting burning charcoal elements 38 as shown in FIG. 2.

An important feature of the invention is the means for collecting the ashes produced by the burning charcoal elements 38 on the grate bars 36. For this purpose, I have provided the deep cylindrical ash pot or container 14 having an imperforate bottom wall 42 and upstanding circular side wall 44 with an open top. The open top of the container fits snugly over the depending ring 30 of the pan 18 with the top edge engaging the outer surface of the bottom of the pan as seen in FIG. 2. Threaded nuts 46 are welded or otherwise secured to the outer surface of the top of the pot or container and aligned with the nuts 46 are smooth-walled holes 48 and formed in the depending flange 30 are smooth-walled holes 50. Threaded hand bolts 52 pass through the nuts and aligned holes in the container and depending flange, for releasably securing the container in depending condition. It will be noted that the bottom wall of the container is remote from the charcoal supporting bars 36 and from the charcoal so that there is no chance of the ashes accumulating around the grate bars 36 or supported charcoal elements 38. A series of spaced holes 54 is formed in the side wall 44 midway the top and bottom thereof and below the grate bars 36.

The grill 16 comprises a pair of spaced parallel side bars or angle irons 56 to and between which are secured a plurality of closely spaced round crossbars 58. At each end, a looped handle 60 is welded to the end crossbar 58, extending longitudinally of the grill. The grill is so dimensioned that it fits between the flanges 20 of the pan 18 with the side bars 56 sliding in the guideways or tracks 62 formed by the L-shaped rail 20 of the pan 18.

In use, the live charcoal elements 38 are placed on the bars 36 of the grate of the brazier unit and the grill 16 is slid along the guideways or tracks 62 into position over the grate. The meat or other article to be cooked is placed on the grill over the ring-shaped grate 34. Air passes through the vents 54 in the container 14 upwardly between the charcoal units and upwardly through the grate 34. Air also passes all around the charcoal elements so that complete combustion is provided.

When the meat is cooked, the grill 16 can be slid carrying the cooked meat away from the grate 34 yet in close proximity thereto leaving space on the grill to support more meat over the grate 34 while the cooked meat is held in warmed condition on the grill.

In FIG. 4, a modified manner of releasably attaching ash container 14' to braizer unit 12' is shown. Herein, in place of the bolt and nut arrangement of FIG. 2, the depending flange 30' of the pan 18' is formed with curved protuberances 63 on the outer surface thereof. The dimensions of the depending flange 30' and ash container 14' are such that the protuberances frictionally engage the inner surface of the container and releasably hold the parts against displacement from one another.

The shape, construction and portability of the improved barbecue grill assembly 10 permits it to be used either outdoors or indoors and to be readily mounted on all various types of supports and conveyances.

In FIG. 5, the barbecue grill assembly 10 shown in FIG. 1 is shown supported on a rollable cart 64 square in plan having four corner legs 66, on casters 68, and having a shelf 70 bracing the legs intermediate the ends thereof. The pan 18 is placed on top of the legs 66 and the cart 64 with supported barbecue grill assembly can be readily rolled from place to place.

Figure 6:
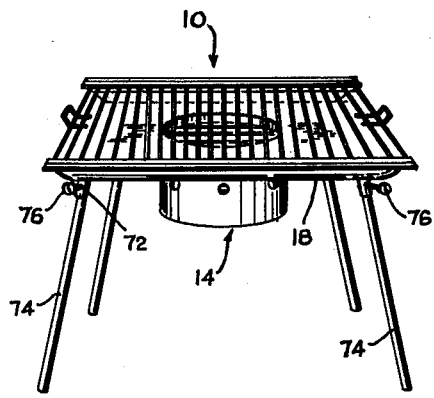
FIG. 6 is a top perspective view showing the barbecue grill assembly mounted on and applied to a support with removable legs.

In FIG. 6, the barbecue grill assembly 10 is shown provided with tubular sockets 72 adjacent the corners thereof, for receiving supporting legs 74 disposed at a slight angle to the vertical and held releasably in supported condition in the sockets by means of set screws 76.

Figure 7:
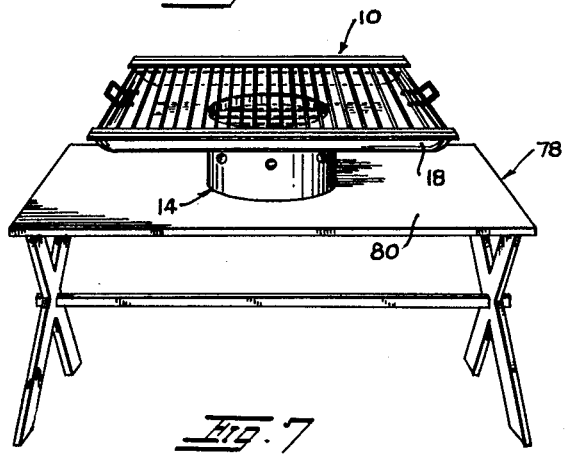
FIG. 7 is a top perspective view showing the barbecue grill assembly mounted on an elongated table.

FIG. 7 illustrates the barbecue grill assembly 10 supported by the ash container 14 on an elongated picnic table 78 especially designed for outdoor use. The ash container 14 is placed on the top 80 of the table, and the grill assembly is supported in balanced condition thereupon.

Figure 8:
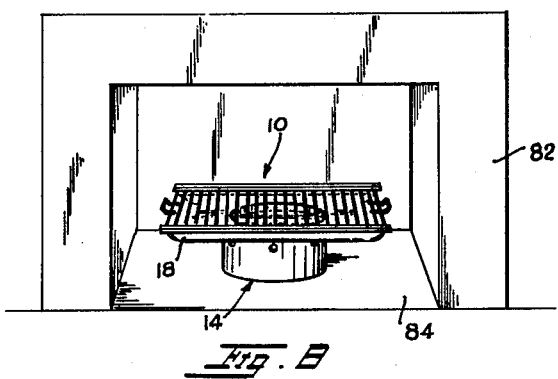
FIG. 8 is a top perspective view showing the barbecue grill assembly resting on the floor of an indoor fireplace.

In FIG. 8, the barbecue grill assembly 10 is shown in an indoor fireplace 82 supported on the base or floor 84 thereof by the ash container 14.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A portable barbecue grill assembly comprising an elongated rectangular shallow pan having a bottom wall and a pair of upwardly extending side walls which terminate in outwardly and upwardly extending L-shaped flanges thereby providing a pair of spaced parallel trackways, a centrally disposed circular opening in the said bottom wall, a cylindrical downwardly extending ring secured to said bottom wall about said opening, the lower end of said ring terminating in a horizontally and inwardly disposed annular flange, a circular grate comprising a plurality of closely spaced parallel bars secured to said annular flange; a deep cylindrical ash pot having a closed lower end and an open upper end in which said downwardly extending cylindrical ring is telescopically mounted, means by which said downwardly extending ring is removably secured in the upper end of said ash pot, a plurality of vent holes in the side wall of said pot intermediate the upper and lower ends thereof; an elongated rectangular grill comprising a pair of spaced parallel side bars and a plurality of spaced parallel crossbars which are secured to and between said side bars, an outwardly extending handle secured to each end crossbar of said plurality of crossbars, said grill being slidably mounted on said pan with said side bars disposed in said trackways; the opposite ends of said pan and the said grill mounted thereon extending a substantial distance on each side of said opening and said grate whereby said grill may be shifted in either direction to position food disposed thereon directly over said grate, a short distance away from said grate, or remotely positioned from said grate at the ends of said pan so that well done, medium and rare foods may be simultaneously prepared in substantially the same length of time.

References Cited by the Examiner
UNITED STATES PATENTS

| D. 139,850 | 12/44 | Frenning | 126—25 X |
| 101,177 | 3/70 | Stevenson | 126—245 |
| 514,057 | 2/94 | Bergmann | 292—251 |
| 875,338 | 12/07 | Foery | 292—153 |
| 1,479,358 | 1/24 | Behringer | 292—251 X |
| 2,168,944 | 8/39 | Polhemus | 126—25 X |
| 2,513,580 | 7/50 | Milligan | 126—25 |
| 2,687,716 | 8/54 | Wong | 126—25 X |
| 2,894,447 | 7/59 | Persinger et al. | 126—25 X |

JAMES W. WESTHAVER, *Primary Examiner.*

PERCY L. PATRICK, *Examiner.*